(12) United States Patent
Klügel

(10) Patent No.: US 12,464,171 B2
(45) Date of Patent: Nov. 4, 2025

(54) SYSTEM AND METHOD FOR SYNCHRONIZED DATA PLAYBACK AND AIRCRAFT

(71) Applicant: Airbus SAS, Blagnac (FR)

(72) Inventor: Markus Klügel, Blagnac (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 18/321,915

(22) Filed: May 23, 2023

(65) Prior Publication Data

US 2023/0396813 A1 Dec. 7, 2023

(30) Foreign Application Priority Data

Jun. 2, 2022 (EP) ..................................... 22176894

(51) Int. Cl.
*H04N 21/214* (2011.01)
*B64D 11/00* (2006.01)
*H04N 21/43* (2011.01)
*H04N 21/472* (2011.01)

(52) U.S. Cl.
CPC ..... *H04N 21/2146* (2013.01); *H04N 21/4305* (2013.01); *H04N 21/47217* (2013.01)

(58) Field of Classification Search
CPC ............ H04N 21/2146; H04N 21/242; H04N 21/4302; H04N 21/4305; H04N 21/4307; H04N 21/43076; H04N 21/47217; H04L 65/1101; H04L 65/612; H04L 65/65; H04L 65/80
See application file for complete search history.

(56) References Cited

U.S. PATENT DOCUMENTS

| | | | | |
|---|---|---|---|---|
| 2004/0228367 | A1* | 11/2004 | Mosig | H04L 65/1101 370/503 |
| 2008/0052408 | A1* | 2/2008 | Saito | H04N 21/44222 386/E5.052 |
| 2008/0291863 | A1* | 11/2008 | Agren | H04N 21/43637 370/503 |
| 2022/0224431 | A1 | 7/2022 | Williams et al. | |
| 2022/0360838 | A1* | 11/2022 | Dalal | H04W 8/005 |

FOREIGN PATENT DOCUMENTS

WO 2006110960 A1 10/2006

OTHER PUBLICATIONS

European Search Report for corresponding European U.S. Appl. No. 22/176,894 dated Nov. 17, 2022; priority document.

* cited by examiner

*Primary Examiner* — Rong Le
(74) *Attorney, Agent, or Firm* — Greer, Burns & Crain, Ltd.

(57) ABSTRACT

A system for synchronized data playback comprising at least one offset calculation device; and a plurality of clients; wherein the plurality of clients are each synchronized to a shared reference timeframe, each of the plurality of clients is configured to receive a common set of timestamped data frames, the offset calculation device is configured to determine a synchronized playback time for each of the common set of timestamped data frames with respect to the shared reference timeframe; and each of the plurality of clients is configured to playback each of the common set of timestamped data frames at the respective determined playback time.

12 Claims, 3 Drawing Sheets

SYSTEM AND METHOD FOR SYNCHRONIZED DATA PLAYBACK AND AIRCRAFT

CROSS-REFERENCES TO RELATED APPLICATIONS

This application claims the benefit of the European patent application No. 22176894.8 filed on Jun. 2, 2022, the entire disclosures of which are incorporated herein by way of reference.

FIELD OF THE INVENTION

The present invention is directed to a system for synchronized data playback and a method for synchronized data playback, as well as an aircraft comprising a system for synchronized data playback.

BACKGROUND OF THE INVENTION

Connected multimedia systems have seen significant use in recent times. Typical implementations of multimedia stream systems comprise a server and client part. The server converts multimedia content into digital data and encodes it for more efficient storage. The encoded data is segmented into different frames, each of which refers to a specific recorded time span. To identify the time span that the frames refer to, they are sometimes marked with time stamps. The timestamps do not refer to an absolute time but instead create a time frame relative to which the frames may be placed for playback. The client then receives the stamped frames and transforms the encoded data into a form that can be input to a playback device.

In some situations, for example in aircraft, multiple clients receive multimedia content and are intended to play it simultaneously over multiple screens or speakers. Each client needs to play it at a predefined time instant, otherwise psycho-acoustic effects can lower the perceived quality of the media experience.

Also, other cases exist in which data needs to be played back synchronously, e.g., when several robots cooperatively solve a task they may do this by "playing back" specific actions that are injected by a remote controller. Therefore, it is appropriate to talk about general "data playback", with multimedia being the primary use-case.

Two factors can be mainly responsible for a loss of synchronicity: network jitter, i.e., random small delays in the transmission of data from server to client, and clock synchronicity, i.e., small differences in the speed at which internal clocks of each device run.

SUMMARY OF THE INVENTION

Consequently, it is a goal of the present invention to provide an option for synchronized data playback which minimizes these effects and improves overall synchronicity of data playback.

To that effect, a first aspect of the invention provides a system for synchronized data playback comprising at least one offset calculation device, and a plurality of clients, wherein the plurality of clients are each synchronized to a shared reference timeframe, each of the plurality of clients is configured to receive a common set of timestamped data frames, the offset calculation device is configured to determine a synchronized playback time for each of the common set of timestamped data frames with respect to the shared reference timeframe; and each of the plurality of clients is configured to playback each of the common set of timestamped data frames at the respective determined playback time.

A further aspect of the invention provides a method for synchronized data playback. A shared synchronized timeframe is provided to a plurality of clients. A common set of timestamped data frames is received at each of the plurality of clients. A synchronized playback time for each of the timestamped data with respect to the shared synchronized timeframe is determined by an offset calculation device. Each of the common set of timestamped data frames is played back at the determined synchronized playback time by each of the plurality of clients.

One idea of the present invention lies in imposing synchronicity of data playback by synchronizing the timeframe in which the plurality of clients operate and setting a specified time within that timeframe at which each frame of the data should be played back. In this way, all clients play back the data at the specified time and no adverse effects based on a loss of synchronicity occur.

Advantageous embodiments and further developments are apparent from the further dependent claims and from the description with reference to the figures.

According to an embodiment, the system further comprises a reference clock configured to provide the shared reference timeframe to each of the plurality of clients. This way, the shared reference timeframe can be tightly controlled in an advantageous manner.

According to another embodiment, the system further comprises a server configured to provide the common set of timestamped data frames to each of the plurality of clients. This way, the transmission of the data frames to the clients can be tightly controlled in an advantageous manner.

According to a further embodiment, the server comprises at least one offset calculation device. This allows for an advantageous transmission of the synchronized playback times along with the data frames themselves.

According to a further embodiment, each of the plurality of clients comprises of at least one offset calculation device. In this embodiment, each client determines its own synchronized playback time and a loss of synchronicity between them can be easily detected and rectified.

According to a further embodiment, each of the plurality of clients comprises a synchronization buffer configured to store at least one of the common set of data frames until the respective determined playback time. In this way, each client can advantageously restore its synchronicity to the other clients in case of loss of synchronicity.

According to a further embodiment, each of the plurality of clients is configured to control a speed at which a decoder associated with each respective client processes the common set of data frames. This embodiment can allow an advantageous integration of external devices into the system.

Furthermore, an aircraft comprising a system according to the present invention is provided.

The above embodiments and further developments can be combined with each other as desired, if useful. Further possible embodiments, further developments and implementations of the invention also comprise combinations of features of the invention described above or below with respect to the embodiments which are not explicitly mentioned. In particular, the person skilled in the art will also add individual aspects as improvements or additions to the respective basic form of the present invention.

BRIEF DESCRIPTION OF THE DRAWINGS

The present invention is explained in more detail below with reference to the embodiments shown in the schematic figures.

The accompanying figures are intended to provide a further understanding of embodiments of the invention. They illustrate embodiments and, in connection with the description, serve to explain principles and concepts of the invention. Other embodiments and many of the advantages mentioned will be apparent with reference to the drawings. The elements of the drawings are not necessarily shown to scale with respect to each other.

In the figures of the drawings, identical elements, features and components that have the same function and the same effect are each given the same reference signs, unless otherwise specified.

DETAILED DESCRIPTION OF THE PREFERRED EMBODIMENTS

Figure 1:
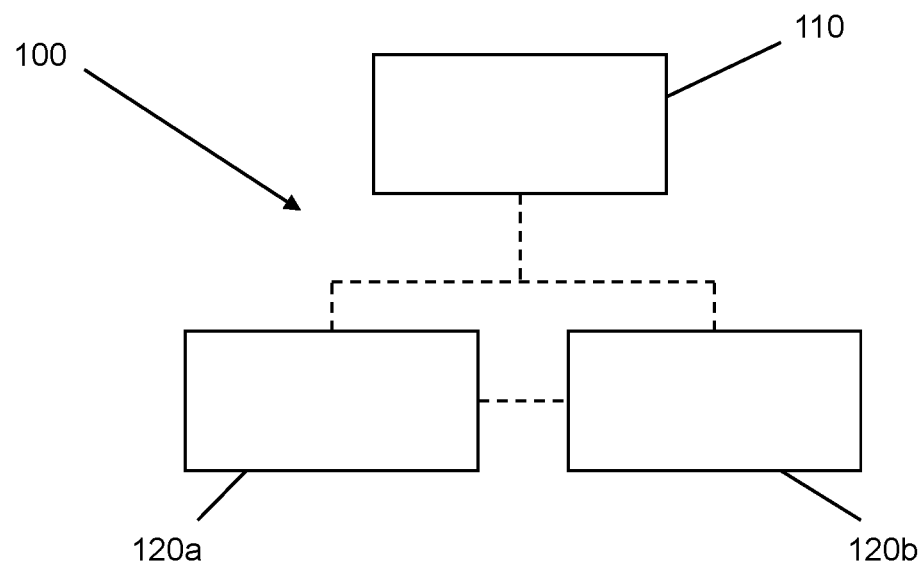
FIG. 1 shows a schematic illustration of an embodiment of a system for synchronized data playback.

FIG. 1 shows a system 100 for synchronized data playback. The system 100 comprises an offset calculation device 110 and two clients 120a and 120b.

The clients 120a and 120b are each synchronized to a shared reference timeframe. The clients 120a and 120b are further configured to receive a common set of timestamped data frames. The offset calculation device 110 is configured to determine a synchronized playback time for each of the common set of timestamped data frames with respect to the shared reference timeframe. The clients 120a and 120b are further configured to playback each of the common set of timestamped data frames at the respective determined playback time.

One way of determining the synchronized playback time is to calculate an offset between the timeframe in which the data frames are stamped and the synchronized timeframe and then to set a time delay for the data playback which is equal to or greater than the offset between the two timeframes. This offset between the two timeframes can be calculated if both a relative clock drift, which can arise if the respective clocks run at different speeds, and an offset at an initial point in time are known. If there is no relative clock drift, this offset remains constant for all frames. If a relative clock drift exists, it can be necessary to determine an individual offset for each data frame.

Figure 2:
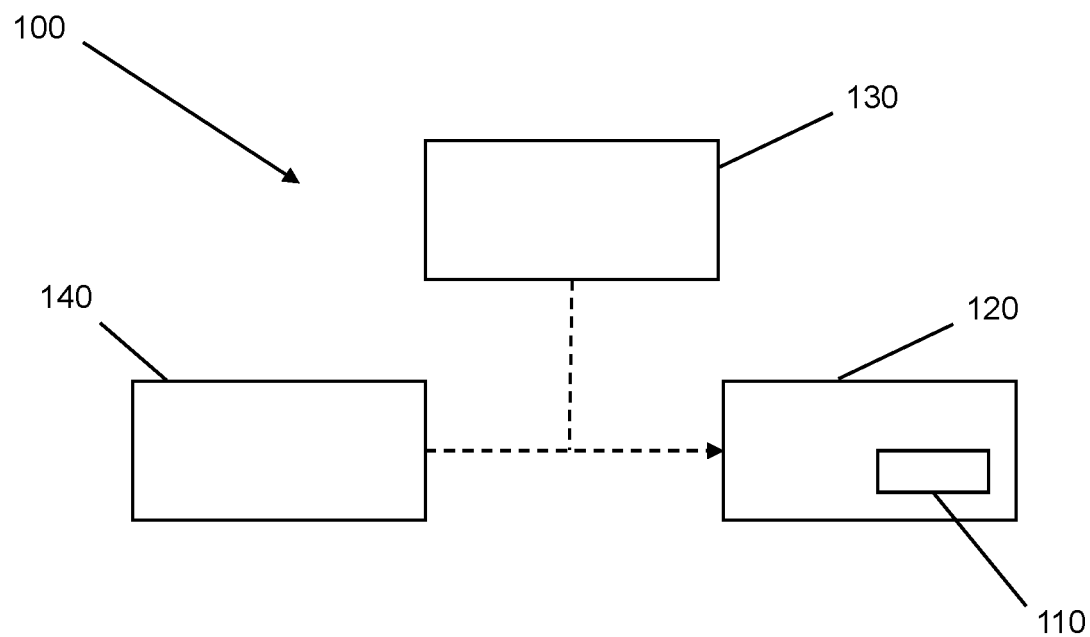
FIG. 2 shows a schematic illustration of a further embodiment of a system for synchronized data playback.

FIG. 2 shows a system 100 for synchronized data playback. The system 100 comprises a reference clock 130, a server 140, and a client 120, which represents a plurality of functionally identical clients, which are not shown for clarity reasons. The client 120 comprises an offset calculation device 110.

The features of the system 100 shown in FIG. 2 function essentially the same as the features of the system 100 shown in FIG. 1. Furthermore, the reference clock 130 is configured to provide the shared reference timeframe to each of the plurality of clients 120, and the server 140 is configured to provide the common set of timestamped data frames to each of the plurality of clients 120.

As shown in FIG. 2, the reference clock 130 can be arranged externally to both the server 140 and the plurality of clients 120. Alternatively, the server 140 could comprise the reference clock 130. In such a case, the data needed to synchronize the timeframes of the plurality of clients 120 can be transmitted separately from or together with the set of common data frames. In another alternative embodiment, the plurality of clients 120 could establish the synchronized time frame through communication between each other.

The server 140 might comprise an encoder for transforming a data stream, which could be either a live feed or stored on a storage medium, into the common set of timestamped data frames. Alternatively, the common set of timestamped data frames might be provided to the server 140, which then distributes the set to each of the plurality of clients 120. The server 140 might comprise a storage medium to store the original data stream and/or the common set of timestamped data frames.

Figure 3:
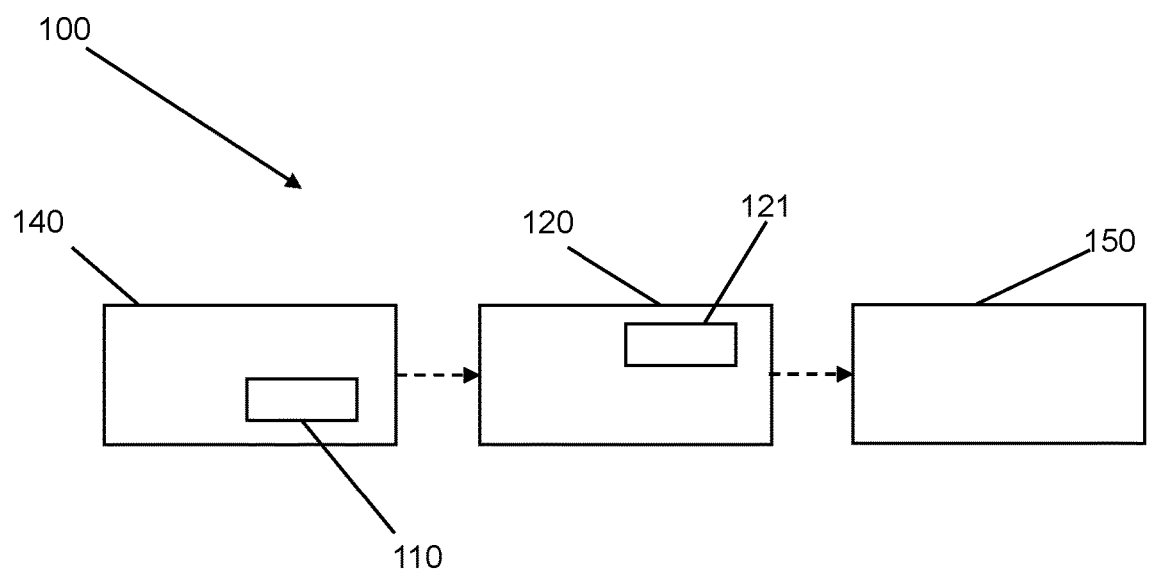
FIG. 3 shows a schematic illustration of a further embodiment of a system for synchronized data playback.

FIG. 3 shows a system 100 for synchronized data playback. The system 100 comprises a server 140, a client 120, which represents a plurality of functionally identical clients, and a decoder 150, which represents a plurality of functionally identical decoders. The server 140 comprises an offset calculation device 110. The client 120 comprises a synchronization buffer 121.

The synchronization buffer 121 is configured to store at least one of the common set of data frames until the respective determined playback time. The decoder 150 is associated with the client 120, and the client is configured to control a speed at which the decoder 150 processes the common set of data frames.

The client 120 passes the common set of data frames along to the decoder 150 for further processing in such a way that the data frames are played back at the determined synchronized playback time.

Through increasing or decreasing the speed at which the decoder 150 processes the data frames and/or by discarding data frames from the synchronization buffer 121 instead of passing them along to the decoder 150, synchronicity between clients can be restored if one or more of the plurality of clients 120 start lagging behind the others.

In an alternative embodiment, the client 120 may comprise the decoder 150. In a different alternative embodiment, the system 100 might not comprise a decoder 150, but the client 120 might be associated with a decoder of a different device, and be able to control the decoder in the way described above.

Figure 4:
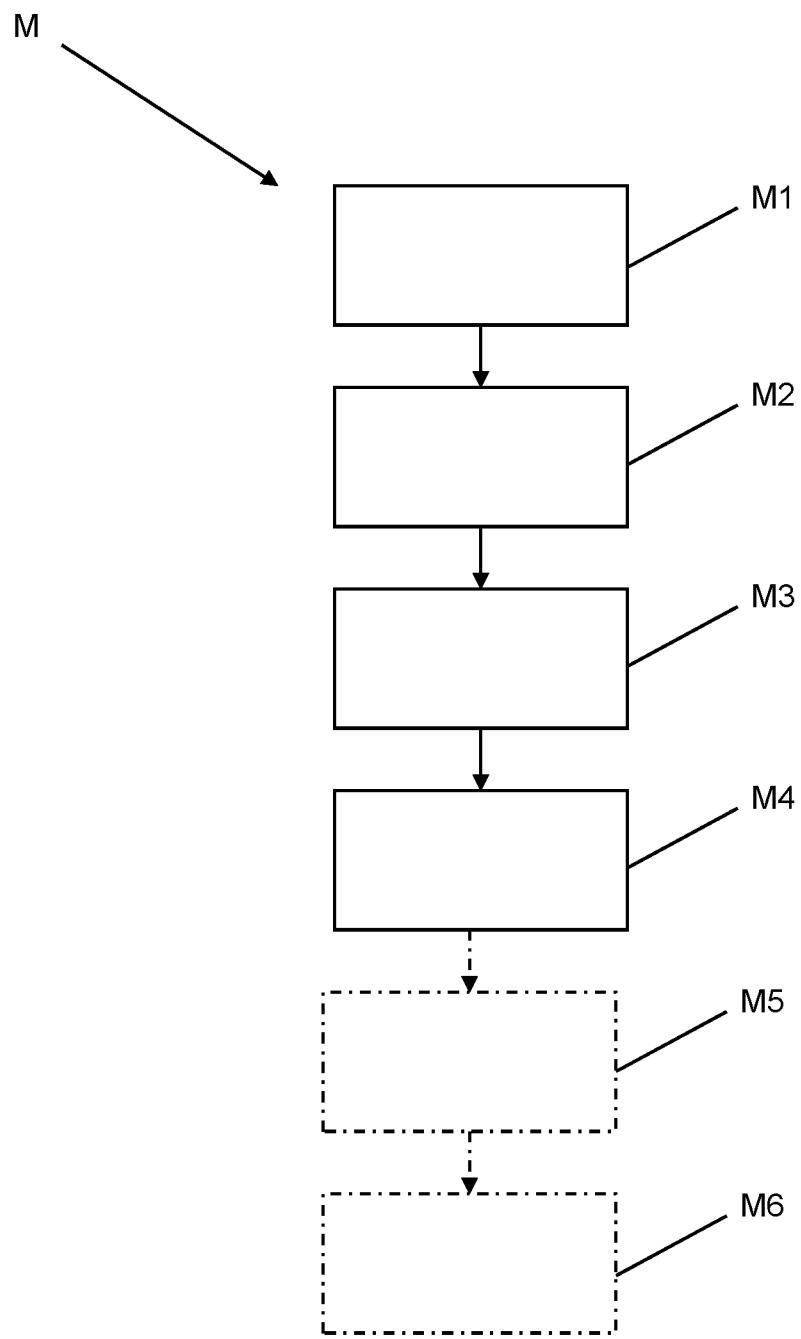
FIG. 4 shows a schematic flow diagram of an embodiment of a method for synchronized data playback.

FIG. 4 shows a schematic flow diagram of a method M for synchronized data playback. In a method step M1, a shared synchronized timeframe is provided to a plurality of clients. In a further method step M2, a common set of timestamped data frames is received at each of the plurality of clients. In a further method step M3, a synchronized playback time for each of the timestamped data with respect to the shared synchronized timeframe is determined by an offset calculation device. In a further method step M4, each of the common set of timestamped data frames is played back at the determined synchronized playback time by each of the plurality of clients.

FIG. 4 further shows two optional method steps. In one optional method step M5, at least one of the common sets of data frames is stored in a synchronization buffer of each of the plurality of clients until the respective determined playback time. In a further optional method step M6, a speed at which a decoder associated with each respective client processes the common set of data frames is controlled by the respective client.

Throughout the application, reference has been made to a common set of timestamped data frames. It should be understood that for the present invention to be performed, it is not actually necessary that each and every one of the common set of data frames be timestamped. It can suffice that at least one of the data frames be timestamped, if the relation between the data frames allows for the time associated with each data frame in the timeframe of the timestamps to be determined, e.g., if the data frames are numbered and the time duration for each data frame is known. In this way, it can suffice to timestamp a single, initial data frame, to timestamp data frames at set intervals, or even to timestamp random data frames. All these scenarios are explicitly part of the present invention.

Throughout the application, reference has been made to "a common set of data frames". In general, this can be understood to mean that every client receives the exact same data frames. However, as has been mentioned, there may be cases where different clients receive different data frames, which should nevertheless be played back in synchronicity, i.e., such that the total sum of all frames played back by all clients leads to the desired outcome. Such cases are to be explicitly incorporated into the present invention and in these cases the term "common set of data frames" is to be understood that all the frames received by all clients come from a common set, even though different clients may receive different data frames.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 100 system
110 offset calculation device
120 client
120a client
120b client
121 synchronization buffer
130 reference clock
140 server
150 decoder
M method
M1 step of providing a shared reference timeframe
M2 step of receiving data frames
M3 step of determining synchronized playback time
M4 step of playing back data frames
M5 step of storing data frames
M6 step of controlling speed of data processing

The invention claimed is:

1. An aircraft comprising:
a system for synchronized data playback comprising:
at least one offset calculation device;
a plurality of clients; and,
a plurality of decoders, each decoder associated with one client from the plurality of clients,
wherein the plurality of clients are each synchronized to a shared reference timeframe,
wherein each of the plurality of clients is configured to receive a common set of timestamped data frames,
wherein the offset calculation device is configured to determine a synchronized playback time for each of the common set of timestamped data frames with respect to the shared reference timeframe,
wherein each of the plurality of clients is configured to playback each of the common set of timestamped data frames at the respective determined playback time,
wherein each of the plurality of decoders processes the common set of timestamped data frames to provide a synchronicity between the clients of the plurality of clients, and
wherein each of the plurality of clients determines a processing characteristic in which the decoder associated with said respective client processes the common set of data frames to restore the synchronicity, the processing characteristic selected from a group consisting of:
a speed at which the decoder processes the common set of data frames; and
a number of frames processed by the decoder including less than and including a total number of frames in the common set of data frames.

2. The aircraft according to claim 1, wherein the system further comprises a reference clock configured to provide the shared reference timeframe to each of the plurality of clients.

3. The system aircraft according to claim 1, wherein the system further comprises a server configured to provide the common set of timestamped data frames to each of the plurality of clients.

4. The aircraft according to claim 3, wherein the server comprises at least one offset calculation device.

5. The aircraft according to claim 1, wherein each of the plurality of clients comprises one of the at least one offset calculation device.

6. The aircraft according to claim 1, wherein each of the plurality of clients comprises a synchronization buffer configured to store at least one of the common set of data frames until the respective determined playback time.

7. A method for synchronized data playback in an aircraft, comprising the steps of:
providing a shared synchronized timeframe to a plurality of clients in the aircraft;
receiving a common set of timestamped data frames at each of the plurality of clients;
determining a synchronized playback time for each of the timestamped data with respect to the shared synchronized timeframe by an offset calculation device; and,
playing back each of the common set of timestamped data frames at the determined synchronized playback time by each of the plurality of clients,
wherein each of the plurality of clients determines a processing characteristic in which a decoder associated with each respective client processes the common set of data frames to provide a synchronicity between the clients of the plurality of clients or to restore a synchronicity between the clients of the plurality of clients, the processing characteristic selected from a group consisting of:
a speed at which the decoder processes the common set of data frames; and a number of frames processed by the decoder including less than and including a total number of frames in the common set of data frames.

8. The method according to claim 7, wherein the shared synchronized timeframe is provided by a reference clock.

9. The method according to claim 7, wherein the common set of timestamped data frames are provided to each of the plurality of clients by a server.

10. The method according to claim 9, wherein the server comprises at least one offset calculation device.

11. The method according to claim 7, wherein each of the plurality of clients comprises one of the at least one offset calculation device.

12. The method according to claim 7, further comprising a storing of at least one of the common set of data frames until the respective determined playback time in a synchronization buffer of each of the plurality of clients.

* * * * *